US010084854B2

United States Patent
Lewis et al.

(10) Patent No.: US 10,084,854 B2
(45) Date of Patent: Sep. 25, 2018

(54) RESPONSE LATENCY REDUCTION IN FIXED ALLOCATION CONTENT SELECTION INFRASTRUCTURE

(71) Applicant: Google Inc., Mountain View, CA (US)

(72) Inventors: Justin Lewis, Mountain View, CA (US); Gavin James, Mountain View, CA (US)

(73) Assignee: Google LLC, Mountain View, CA (US)

( * ) Notice: Subject to any disclaimer, the term of this patent is extended or adjusted under 35 U.S.C. 154(b) by 184 days.

(21) Appl. No.: 15/127,566

(22) PCT Filed: Apr. 22, 2016

(86) PCT No.: PCT/US2016/029012
§ 371 (c)(1),
(2) Date: Sep. 20, 2016

(87) PCT Pub. No.: WO2017/184177
PCT Pub. Date: Oct. 26, 2017

(65) Prior Publication Data
US 2018/0167446 A1    Jun. 14, 2018

(51) Int. Cl.
*G06F 15/173*    (2006.01)
*H04L 29/08*    (2006.01)
(Continued)

(52) U.S. Cl.
CPC .... *H04L 67/1002* (2013.01); *G06F 17/30864* (2013.01); *H04L 43/08* (2013.01); *H04L 43/16* (2013.01); *H04L 47/82* (2013.01)

(58) Field of Classification Search
USPC .......................... 709/206, 200, 239, 219, 226
See application file for complete search history.

(56) References Cited

U.S. PATENT DOCUMENTS 8,112,586 B1 * 2/2012 Reiner ................ G06F 12/0897
711/119
8,866,911 B1 * 10/2014 Sivertsen ............. H04N 17/045
348/177
(Continued)

FOREIGN PATENT DOCUMENTS

WO    WO-2013/160721    10/2013

OTHER PUBLICATIONS

International Search Report and Written Opinion PCT App. No. PCT/US2016/029012 dated Jun. 27 2016 153 pages.

*Primary Examiner* — El Hadji Sall
(74) *Attorney, Agent, or Firm* — Foley & Lardner LLP

(57) ABSTRACT

The present disclosure is directed to reducing response latency in fixed allocation content selection infrastructure. An allocator engine selects a content campaign for offline selection based on an allocation metric for the content campaign. A load balancer component identifies, in a distributed computing environment and based on resource utilization information, a computation resource and a time window during which to launch the offline selection. A content selector component launches, during the time window, the offline selection and generates candidate impression criteria. The content selector component receives a request for content via a computer network. Responsive to the request matching the candidate impression criteria, the content selector component disables a real-time selection for the request. The content selector component transmits instructions to render a content item object corresponding to the matching candidate impression criteria generated during the offline selection.

20 Claims, 8 Drawing Sheets

(51) Int. Cl.
*G06F 17/30* (2006.01)
*H04L 12/26* (2006.01)
*H04L 12/911* (2013.01)

(56) References Cited

U.S. PATENT DOCUMENTS

| | | | |
|---|---|---|---|
| 9,542,450 B1* | 1/2017 | Jacobsson | G06F 17/3053 |
| 2012/0300854 A1* | 11/2012 | Chen | H04N 7/152 |
| | | | 375/240.25 |
| 2014/0019868 A1* | 1/2014 | Varian | G06F 17/30864 |
| | | | 715/738 |
| 2014/0195643 A1* | 7/2014 | Liu | H04L 67/06 |
| | | | 709/217 |
| 2014/0244402 A1* | 8/2014 | Binas | G06F 3/0481 |
| | | | 705/14.69 |
| 2016/0086224 A1* | 3/2016 | Binas | G06Q 30/0256 |
| | | | 705/14.54 |
| 2016/0335250 A1* | 11/2016 | Breitenbach | G06F 17/2765 |
| 2017/0230329 A1* | 8/2017 | Akef | H04L 61/2076 |

* cited by examiner

RESPONSE LATENCY REDUCTION IN FIXED ALLOCATION CONTENT SELECTION INFRASTRUCTURE

BACKGROUND

Information can be displayed in a graphical environment, web pages or other interfaces by a computing device. The graphical environment or web pages can include text, images, video, or audio information provided by the entities via an application server or web page server for display on the Internet. Additional content item objects can also be provided by third parties for display on the web pages together with the information provided by the entities. Thus, a person viewing a graphical environment can access the information that is the subject of the web page, as well as selected third party content item objects that may or may not be related to the subject matter of the web page. Due to the large number of available content item objects and the resource intense nature of the electronic graphical environment, it may be challenging to efficiently select and provide content item objects for display in the graphical environment.

SUMMARY

The present disclosure provides a technique for load balancing. The technique allocates computing utilization of a distributed computing environment comprising at least one processor in communication with at least one memory. In particular, the present disclosure relates to a technique in which a client computing device issues a request (e.g., a search request in an Internet search engine) and the distributed computing environment provides a response to the request.

Such requests by a client computing device can be handled within the distributed computing environment on a real-time basis. However, difficulties may arise during periods in which the number of requests is relatively high. For example, it may be challenging for the distributed computing environment to timely respond to a large number of requests received during a short time period due to the resource intensive nature of performing a real-time content selection process.

Systems and methods of the present technical solution are directed to mitigating high data processing, data storage and network traffic rates during high peak times. The systems and methods of the present solution can provide a data processing system configured to facilitate reducing response latency in fixed content allocation. The data processing system or device can manage computing utilization of one or more processors and memory of the data processing system. The data processing system can retrieve information regarding computing utilization of the data processing system and determine, based on the retrieved information, a time window, time interval or point of time for launching or computing a computing task in the data processing system. The data processing system can launch, perform, or initiate computing of the computing task at the determined point of time.

At least one aspect of the present disclosure is directed to a system to reduce latency in fixed allocation content selection. The system can include an allocator engine that executes on at least one processor of a data processing system. The allocator engine can determine an allocation metric for a content campaign. A content campaign can include an electronic hierarchical data structure that includes content groups, content item data objects, and content selection criteria. An allocation metric may be a ratio based on the amount of budget remaining and the duration remaining. The allocator engine can select, responsive to a comparison of the allocation metric with a threshold, the content campaign for offline selection. The system can include a load balancer component that executes on the data processing system. The load balancer component can identify a computation resource in the distributed computing environment to perform the offline selection and a time window in which to launch the offline selection. The load balancer component can identify the computation resource and the time window based on resource utilization information received from one or more servers in a distributed computing environment. The system can include a content selector component that executes on the computation resource identified by the load balancer component. The content selector component can launch the offline selection for the content campaign in the time window identified by the load balancer component. The content selector component can generate a plurality of candidate impressions each associated with impression criteria. A candidate impression can refer to a content item object being fetched from its source and being countable. The content selector component can generate the plurality of candidate impressions responsive to the offline selection. The content selector component can receive, via a computer network, a request for content for presentation on a computing device. The request can include selection criteria. The content selector component can perform, responsive to the request, a lookup with the selection criteria in a data structure that stores the plurality of candidate impressions generated by the content selector in the offline selection to identify a first candidate impression of the plurality of candidate impressions associated with first impression criteria that matches the selection criteria of the request. The content selector component can disable, based on a match between the first impression criteria and the selection criteria, a real-time content selection for the request. The content selector component can transmit, via the computer network to the computing device, instructions to render a content item object of the content campaign. The content item object corresponds to the first impression criteria that matches the selection criteria of the request. The instructions cause the computing device to render the content item object for display by a display device of the computing device.

At least one aspect is directed to a method of reducing latency in fixed allocation content selection. The method can include an allocator engine that executes on at least one processor of a data processing system determining an allocation metric for a content campaign. The method can include the allocator engine selecting, responsive to a comparison of the allocation metric with a threshold, the content campaign for an offline selection process. The method can include a load balancer component that executes on the data processing system identifying, using resource utilization information received from one or more servers in a distributed computing environment, a computation resource in the distributed computing environment to perform the offline selection process and a time window during which to launch the offline selection process. The method can include a content selector component that executes on the computation resource identified by the load balancer launching, during the time window identified by the load balancer component, the offline selection process for the content campaign. The method can include the content selector generating, responsive to the offline selection process, a plurality of candidate impressions each associated with impression criteria. The method can include the data processing system receiving, via a computer network, a request for content for presentation on a computing device, the request comprising selection criteria. The method can include the data processing system performing, responsive to the request, using the selection criteria, a lookup in a data structure storing the plurality of candidate impressions generated by the content selector during the offline selection process to identify a first candidate impression of the plurality of candidate impressions having first impression criteria matching the selection criteria of the request. The method can include the data processing system disabling, based on the first impression criteria matching the selection criteria, a real-time content selection process for the request. The method can include the data processing system transmitting, via the computer network to the computing device, instructions to render a content item object of the content campaign. The content item object can correspond to the first impression criteria that matches the selection criteria of the request. The instructions can cause the computing device to render the content item object for display by a display device of the computing device.

At least one aspect is directed to a computer-implemented method for managing computing utilization of a management computing system comprising at least one processor in communication with at least one memory. The management computing system can be configured to exchange data via a network with a computing device. The method can include retrieving information regarding computing utilization of the management computing system. The method can include determining, based on the retrieved information, a point of time for computing a computing task in the management computing system. The method can include computing, at the determined point of time, the computing task in the management computing system. The method can include storing a computing result of the computed computing task in the at least one memory. The method can include obtaining, in response to a request from the client computing device, the stored computing result from the at least one memory. The method can include forwarding data relating to the obtained computing result to the client computing device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
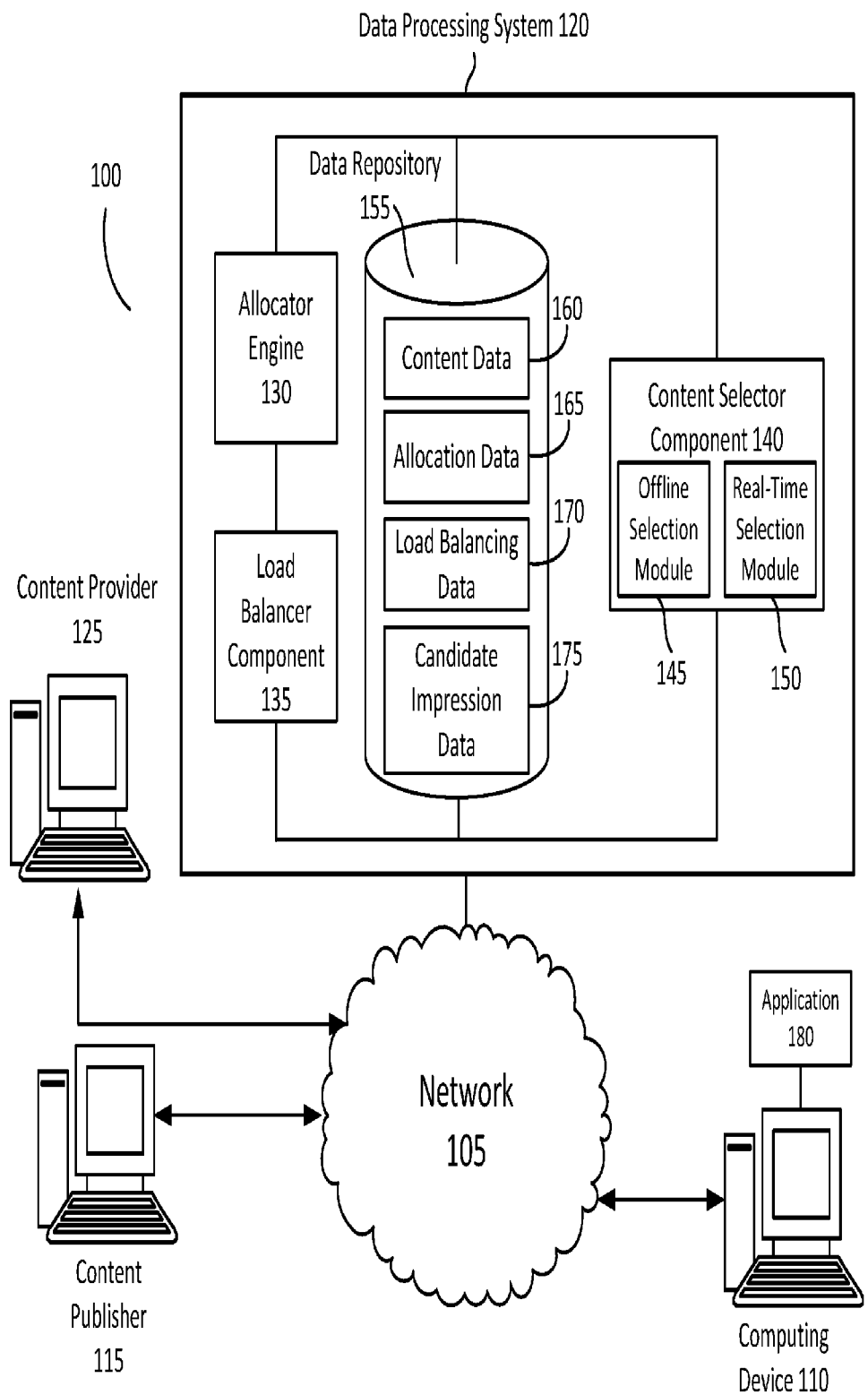
FIG. 1 is an illustration of a system to reduce latency in fixed allocation content selection in accordance with an implementation.

The present disclosure provides a technique for load balancing. The technique allocates computing utilization of a management computing system or data processing system comprising at least one processor in communication with at least one memory. In particular, the present disclosure relates to a technique in which a client computing device issues a request (e.g., a search request in an Internet search engine) and the data processing system provides data to the client computing device in response to the request.

Such requests by a client computing device can be handled within the management computing system or data processing system on a real-time basis. For example, a search engine can process tens of thousands of search queries per second. However, the number of search queries may vary throughout the day. There may be high peak times during which a high number of search queries are issued by the client computing devices (e.g., 1000 queries/second, 8000 queries/second, 10,000 queries/second, 20,000 queries/second, 30,000 queries/second, 40,000 queries/second, 50,000 queries/second, 60,000 queries/second, 70,000 queries/second, 100,000 queries/second, or some other rate that is greater than the low or non-peak rate), and there may be non-peak times during which relatively low numbers of search queries are issued by the client computing devices (e.g., 800 queries/second, 1,000 queries/second, 1,800 queries/second, 2,000 queries/second, 3,000 queries/second, 5,000 queries/second, 7,000 queries/second, 10,000 queries/second, 15,000 queries/second, 20,000 queries/second, 25,000 queries/second, 30,000 queries/second or some other rate that is less than the high rate). The distribution of the high and non-peak times over a day may also depends on the geographical location of the client computing device. For example, during high peak times, more servers within the data processing system than during non-peak times are used to serve the requests by the client computing devices. During high peak times, the utilization rate of the processors, memories and network links within the data processing system is high, which can lead to high data processing, data storage and network traffic costs. However, it may be challenging to avoid high data processing, data storage and network traffic rates during high peak times.

Furthermore, selecting and serving content items such as ads is computationally resource intensive from a data processing system perspective because the selection process includes a number of complicated and expensive steps. Thus, the selection process introduces latency in the content selection and serving flow which negatively impacts client computing devices. In addition, the content selection process has a high cost on CPU usage, memory usage, and internal network traffic. Content items are served all day long, but during peak times more content items are shown, which results in more selection processes being run and thus requires more servers or computation resources to handle the calculations. However, during non-peak times these additional servers are underutilized and thus used inefficiently.

Systems and methods of the present solution are directed to mitigating high data processing, data storage and network traffic rates during high peak times. The systems and methods of the present solution can provide a data processing system configured to facilitate reducing response latency in fixed content allocation. The data processing system or device can manage computing utilization of one or more processors and memory of the data processing system. The data processing system can retrieve information regarding computing utilization of the data processing system and determine, based on the retrieved information, a time window, time interval or point of time for launching or computing a computing task in the data processing system. The data processing system can launch, perform, or initiate computing of the computing task at the determined point of time.

For example, to reduce response latency in fixed content allocation, the data processing system can identify a number of candidate impressions for a content campaign as guaranteed impressions. A candidate impression can refer to an impression having impression criteria that may occur in the future. The data processing system can execute an offline selection service, technique or process to identify these candidate impressions. For example, the data processing system can launch or perform the offline selection several days before the candidate impression actually occurs. The data processing system can establish a number of candidate impressions to fulfill for each future day. The candidate impressions established for the content campaign can be referred to as guaranteed content impressions.

By allocating content item objects to the candidate impressions before receiving a request for content from a client computing device, the data processing system can skip the real-time selection steps at serving time (e.g., a selection process including an online selection process launched after a client computing device requests content and before serving the content to the client computing device), which enables the data processing system to operate faster and to serve the content item objects to the client computing device faster than performing a real-time selection process. Additionally, by identifying the candidate impressions and allocating corresponding content item objects during non-peak computing utilizations times, and serving the content item objects during peak times, the data processing system can reduce the CPU, memory, and network traffic costs during peak traffic conditions. As a result, the data processing system, servers, processors and memory thereof, are more efficiently utilized.

The data processing system can determine whether to apply the offline selection technique to a content campaign. The data processing system can forecast, for a particular content campaign, the likelihood of the content campaign satisfying an allocation or goal (e.g., budget spend or number of impressions). The data processing system can determine, based on a comparison of the forecasted likelihood and a threshold, to trigger the offline selection process. For example, if the data processing system forecasts the content campaign to be at 80% of the desired allocation without using the offline selection technique, then the data processing system can determine to initiate the offline selection process. However, if data processing system forecasts the content campaign to be at 50% of the goal, then the data processing system may disable the offline selection technique because it may be too resource intensive. In another example, if the data processing system determines that the ad campaign is forecasted to hit 100% of the desired allocation, then the data processing system may determine not to use the offline selection technique.

In the offline selection process, the data processing system can retrieve content campaign data, including, for example, content selection criteria, historic impression records, bid amount, or quality score. The data processing system can use the retrieved data to identify at least one future impression to reserve for the content campaign or a content item object of the content campaign. For example, the data processing system can identify a candidate impression based on impression criteria, such as a time, type of client computing device, geographic location, keyword, or other factors used in content selection. The data processing system can allocate a candidate impression to the content campaign.

The data processing system can monitor available impressions in real-time and compare a current impression's criteria with the candidate impression allocated to a content campaign or content item object. Responsive to the data processing system determining a match between the current impression criteria and the impression criteria of the allocated content campaign, the data processing system can provide the content item object of the content campaign.

The data processing system can (1) determine to run the offline selection process for a content campaign based on how close the content campaign is to a desired allocation, or the likelihood of the content campaign satisfying the desired allocation (e.g., based on duration left in the content campaign or percent of budget remaining); (2) the data processing system can identify load balancing characteristics to determine a time of day (or day of week) to initiate, execute, run or launch an offline selection process, and on what server to execute the selection process; (3) launch the offline selection process to identify a list of candidate impressions that are each defined by impression criteria (e.g., time of day, type of computing device, geographic location, or keyword); (4) responsive to a request for content from a client device, compare the impression criteria associated with the request with impression criteria of the candidate impression to identify a match; (5) responsive to identifying the match, disable the real-time selection process and, instead, serve a content item object from the content campaign corresponding to the matching impression criteria.

FIG. 1 illustrates an example system 100 for reducing latency in fixed allocation content selection infrastructure. The system 100 can include content selection infrastructure. The system 100 can include a data processing system 120 communicating with one or more of a content provider computing device 125, content publisher computing device 115 or client computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. A web browser (e.g., application 180) of the computing device 110 can access a web server of the web site operator or content publisher 115 to retrieve a web page for display on a monitor of the computing device 110. The content publisher 115 can provide instructions to the application 180 executing on the computing device 110 to render the content. The web site operator or content publisher 115 generally includes an entity that operates the web page. The web site operator or content publisher 115 includes at least one web page server that communicates with the network 105 to make the web page available to the computing device 110. The data processing system 120 can provide instructions to the application 180 executing on the computing device 110 to render content.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one computation resource or server. The data processing system 120 can include at least one allocator engine 130, at least one load balancer component 135, at least one content selector component 140, at least one offline selection module 145, at least one real-time selection process, and at least one data repository 155. The at least one data repository 155 can include or store, in one or more data structures or data bases, content data 160, allocation data 165, load balancing data 170, and candidate impression data 175. Content data 160 can include, for example, content campaign information, content groups, content selection criteria, content item objects or other information provided by a content provider 125 or obtained or determined by the data processing system to facilitate content selection. The allocation data 165 can include, for example, historical performance of a content campaign, allocation metrics, thresholds, utilization forecasts or other information that can facilitate determining a current allocation or predict a future allocation of a content campaign. The load balancing data 170 can include, for example, load balancing functions, resource utilization information, resource utilization reports, information about a distributed computing environment, computation resource, mapping of servers, memory, location, or other performance information that can facilitate load balancing. The candidate impression data 175 can include one or more candidate impressions or future impressions generated or identified by the content selector component 140 during an offline selection process. The allocator engine 130, load balancer component 135, and content selector component 140, can each include at least one processing unit or other logic device such as programmable logic array engine, or module configured to communicate with the database repository or database 155. The allocator engine 130, load balancer component 135, content selector component 140, and data repository 155 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can include an allocator engine 130 designed, configured, constructed, or operational to provide fixed or predetermined allocation of content item objects of a content campaign. The allocator engine 130 can execute on one or more processors or computation resources of the data processing system 120 to determine an allocation metric for a content campaign. The allocator engine 130 can use the allocation metric to determine a likelihood that a content campaign will reach a predetermined resource allocation, consumption, metric, spend, or threshold. For example, the allocation engine 130 can compare the allocation metric with a threshold to determine whether the allocation metric satisfies the threshold (e.g., the allocation metric is greater than or equal to the threshold). Responsive to the comparison of the allocation metric with the threshold, the allocator engine 130 can enable an offline selection module 145, disable an offline selection process, enable a real-time selection process, or disable a real-time selection process for the content campaign. The allocator engine 130 can enable the offline selection module 145 to cause or result in a fixed or predetermined allocation of the content item objects of the content campaign. For example, a content provider 125 of the content campaign A content provider 125 may establish an electronic content campaign. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, start and end dates for the content campaign, a duration for the content campaign, a schedule for content item object placements, language, geographical locations, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. In some cases, an impression can refer to when a content item object is fetched from its source (e.g., data processing system 120 or content provider 125), and is countable. In some cases, due to the possibility of click fraud, robotic activity can be filtered and excluded, as an impression. Thus, in some cases, an impression can refer to a measurement of responses from a Web server to a page request from a browser 180, which is filtered from robotic activity and error codes, and is recorded at a point as close as possible to opportunity to render the content item object for display on the computing device 110. In some cases, an impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 125 can provide one or more keywords and content item objects to each content group. Keywords can include terms that are relevant to the product or services of associated with or identified by the content item objects. A keyword can include one or more terms or phrases. For example, the car dealership may include "sports car," "V-6 engine," "four-wheel drive," "fuel efficiency," as keywords for a content group or content campaign. In some cases, negative keywords can be specified by the content provider to avoid, prevent, block, or disable content placement on certain search result webpages or content webpages matching those negative keywords. The content provider can specify a type of matching, such as exact match, phrase match, or broad match, used to select content item objects.

The content provider 125 can provide one or more content item objects for selection by the data processing system 120. The data processing system 120 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link.

A content provider 125 may desire to establish a fixed or predetermined allocation of content item objects of a content campaign. For example, the content provider 125 may desire to have 1000 impressions within a time interval or duration, such as 1 week, 2 weeks, 3 weeks, 30 days, or some other duration. In another example, a content provider 125 may establish a fixed budget for the time interval, and desire to spend the entire fixed budget during the time interval. Due to the various payment techniques (e.g., payment can be on a per-impression, click, selection or conversion), and due to the computationally intensive nature of selecting and serving content item objects during peak resource utilization times, it may be challenging to achieve a fixed or predetermined allocation of content item objects of a content campaign during a predetermined time interval.

To facilitate achieving a fixed or predetermined allocation of content item objects of a content campaign, the allocator engine 130 can determine an allocation metric for the content campaign. The allocator engine 130 can determine the allocation metric based on one or more of a predetermined allocation for the content campaign, the current allocation of the content campaign, a rate of allocation of the content campaign, and the remaining duration for the content campaign. For example, the allocation metric can indicate a likelihood of the content campaign achieving the predetermined or desired allocation.

The allocator engine 130 can determine the allocation metric based on a percentage of consumption of the content campaign. For example, the budget for the content campaign may be $100. The allocator engine 130, using historical impression data stored in a content data structure 160 in data repository 155, can determine the amount of spend of the content campaign. The content data structure 160 can include the bid amount each time a content item object of the content campaign was selected by the content selector component 140 for display on a client computing device 110, and sum the bid amounts to determine a total spend for the content campaign over the predetermined time interval. For example, the allocator engine 130 can determine that the spend amount to date may be $80. The allocator engine 130 can further determine that this is 80% of the budget established by the content provider 125 for this content campaign. Thus, in some cases, the allocation metric can include the percent of budget spent for the content campaign.

The allocator engine 130 can determine the allocation metric based on the budget spent for the content and a duration remaining for the content campaign. The allocator engine can combine the budget spent, remaining budget, remaining duration, or duration completed to determine the allocation metric. The allocator engine 130 can determine the allocation metric as a ratio based on the amount of budget remaining and the duration remaining. For example, if the percent budget remaining is 20% and the percent duration remaining is 20%, then the allocator engine 130 can determine the allocation metric as 1. This may indicate that the content campaign is on track to achieve the desired allocation or spend. In another example, the percent budget remaining may be 50% and the duration remaining may be 10%. In this example, the ratio of duration remaining to budget remaining may be percent duration remaining divided by percent budget remaining or a value of 0.2 for the allocation metric. The allocation metric may indicate a likelihood of the content campaign achieving the desired allocation. An allocation metric of 0.2 may indicate a low likelihood of the content campaign achieving the desired allocation as compared to an allocation metric of 1, which may indicate that the content campaign is on track or on pace to achieve the established allocation during the established time interval. An allocation metric greater than 1 may indicate that the content campaign is ahead of schedule and may achieve the desired allocation in less than the established time interval.

The allocator engine 130 can generate a time series forecasting model to determine an allocation metric based on previously observed or identified data. For example, the allocator engine 130 can generate a forecasted allocation for a duration based on the time series forecasting model. The allocator engine 130 can determine a standard deviation for the model to predict a likelihood of the content campaign achieving the established allocation. The allocation engine 130 can determine the allocation metric based on an allocation rate and a duration of the content campaign. For example, the allocator engine 130 can determine that content campaign averages 10,000 impressions per day based on historical impression data, and that there are 10 days remaining for the content campaign. The allocator engine 130 can determine that the standard deviation is low (e.g., less than 15%, 10%, 5%, % 3, % 2, or % 1 of the average). The allocator engine 130 can use the forecasting model to determine a likelihood of the content campaign achieving the desired allocation. For example, if the desired allocation is 100,000 impressions, the current number of impressions is 50,000, the average number of impressions per day is 10,000 with a 10% standard deviation, and there are 10 days left, the allocator engine 130 can determine that there is a high likelihood of the content campaign achieving the desired allocation. The allocator engine 130 can determine there is a high likelihood because an average of 10,000 impressions per day over 10 days will result in 100,000 impressions, which, in addition to the 50,000 impressions that already occurred, will meet or exceed the desired allocation of 100,000 impressions.

The allocator engine 130 can compare the allocation metric with a threshold. Responsive to the comparison of the allocation metric with the threshold, the allocator engine can select the content campaign for the offline selection module 145. In some cases, the allocator engine 130 can enable the offline selection module 145 for the content campaign by setting a parameter of the content campaign, flagging the content campaign, tagging the content campaign, or otherwise providing an indication that content selection for the content campaign is to be performed in an offline selection process. The allocator engine 130 can use the offline selection module 145 for the content campaign if the allocator engine 130 determines that the content campaign may not achieve the desired allocation during the established duration. The allocator engine 130 can use the offline selection module 145 for the content campaign if the allocator engine 130 determines that the content campaign may come within a predetermined percentage of achieving the desired allocation during the established duration. For example, the allocator engine 130 can enable offline selection for the content campaign if the content campaign is at 80% allocation and the remaining duration 10%. However, the allocator engine 130 may disable offline selection for the content campaign if the content campaign is at 80% allocation and the remaining duration is 1%.

The threshold can include a number, percentage, value, range of values, rule, policy, condition, or trigger event that facilitates determining whether to perform the offline selection module 145 for the content campaign. The threshold can vary based on a type of allocation metric. For example, if the allocation metric is based on the percent duration remaining divided by percent budget remaining, then the threshold can include one or more values or a range such as 0.2, 0.3, 0.4, 0.5, 0.6, 0.7, 1.1, 1.2, 1.5, 1.6, 2, 2.5, 3, 3.5 or some other value that facilitates enabling or disabling the offline selection process. The threshold can include a range such as [0.7, 1.3]. The allocator engine 130 can compare the allocation metric with the range to determine if the allocation metric falls within the range. If the allocation metric falls within the range, then the allocator engine 130 can select the content campaign for offline selection. For example, the range of 0.7 to 1.3 can indicate that the budget divided by the time remaining is greater than 0.7 meaning that the content campaign is not too far behind the desired allocation, and the allocation metric being less than 1.3 can indicate that the rate of allocation for the content campaign over the duration is not too far ahead of the desired allocation for the duration. If the allocation rate is too far behind, the allocator engine 130 may disable offline selection or not select offline selection because the slow pace may indicate that the expectations for the content campaign were too high or the content selection criteria were not properly selected. If the allocation rate is high and indicates that the content campaign will easily satisfy the desired location (e.g., the allocation rate is 40% ahead of schedule), then the allocator engine 130 may determine not to select the content campaign for offline selection because the content campaign may satisfy the desired allocation organically.

In some cases, the allocator engine 130 can predict a number of future candidate impressions based on content selection criteria associated with the content campaign. For example, if content selection criteria of the content campaign included a geographic location, keyword, and computing device type, the allocator engine 130 can predict, based on a time series forecasting model, a number of future candidate impressions having impression criteria that match the content selection criteria of the content campaign. If the allocator engine 130 predicts that there may be sufficient future candidate impressions during the time interval that have impression criteria that match the content selection criteria, the allocator engine 130 can enable the content campaign for offline selection. If the allocator engine 130 predicts that there may be insufficient future candidate impressions that will match the content selection criteria, then the allocator engine 130 may not select the content campaign for offline selection. For example, the content selection criteria may include: device geographically located in Antarctica and keyword swimwear. The desired allocation may be 10,000 over a duration of 1 week, and the allocation remaining may be 9,900 and the time remaining may be 1 day. The allocator engine 130 may predict that the future candidate impressions satisfying the content selection criteria is 30 per day, which may not be sufficient to satisfy the desired allocation. Thus, the allocator engine 130 may determine to not select the offline selection process for this content campaign because it may not be possible to achieve the desired allocation over the established duration.

The allocator engine 130 can determine allocation metrics for one or more content campaign, compare the allocation metrics with a threshold, and determine to enable or disable offline selection or real-time selection for each content campaign based on the comparison.

Figure 3:
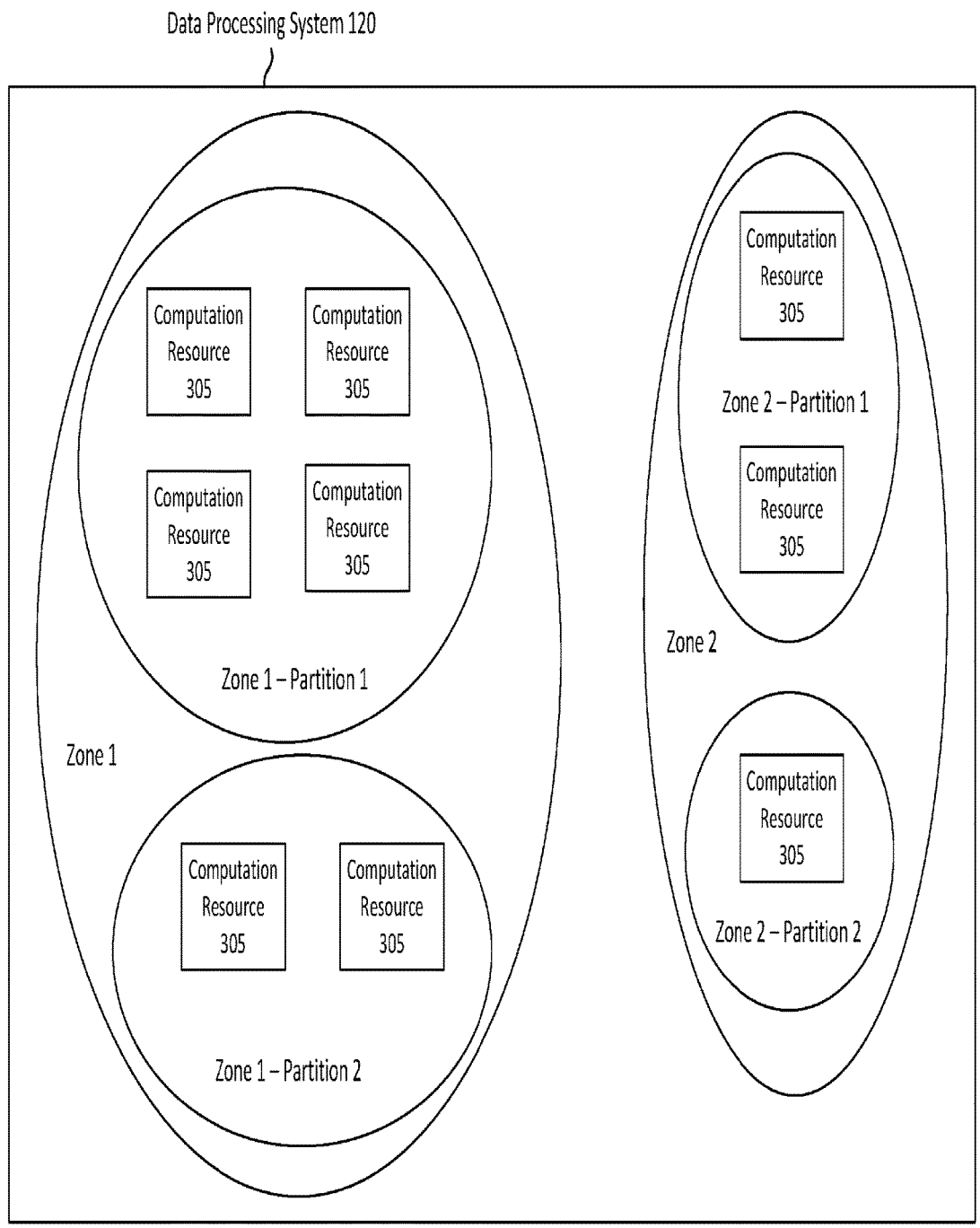
FIG. 3 is an illustration of a data processing system having a distributed computing environment in accordance with an implementation.

The data processing system 120 can include a load balancer component 135. The load balancer component 135 can execute on one or more processors of the data processing system 135. The load balancer component 135 can be designed, configured, constructed or operational to identify a computation resource in the data processing system or distributed computing environment to perform the offline selection process. The load balancer component 135 can identify a time window in which to launch the offline selection process. The data processing system 120 can include or utilize a distributed computing environment. For example, FIG. 3 illustrates a data processing system 120 that includes or utilizes a distributed computing environment. A distributed computing environment can include one or more servers having multiple computation resources located in multiple data racks, partitions, geographic locations, or data centers. The computation resources can be the same type, or include heterogeneous computation resources of different types. Types of computation resources can include, for example, processor types, speed, architecture, memory, operating system, or configuration.

The load balancer component 135 can include a monitor component or module. To identify the computation resource and time window, the load balancer component 135 can monitor (e.g., via the monitor component) at least one of the one or more servers having one or more computation resources to generate a resource utilization report indicating sinusoidal utilization versus time for the computation resource. The load balancer component 135 can receive historical utilization information or monitor the computation resource to obtain, detect, measure, or otherwise identify the historical utilization information. The load balancer component 135 can select the time window based on a trough in the resource utilization report. The load balancer component 135 can include or be configured with a task manager functionality or performance monitor to monitor processor, memory, network, input/output, or other utilization of one or more computation resources. The load balancer component 135 can include one or more counters to observe, monitor, measure, detect or otherwise identify resource utilization and historical utilization information. For example, a counter can determine the amount of time a processor spends processing a non-idle thread. One or more counters can be configured to identify the amount of time a processor spends processing a type of thread or a task from a particular script, application, program, or service (e.g., online content selection process, real-time content selection process, search query, SQL server processes, or disk usage. One or more counters can be configured to identify a processor queue length that indicates a number of threads waiting for processor time. The queue length can indicate resource utilization or availability.

Figure 2:
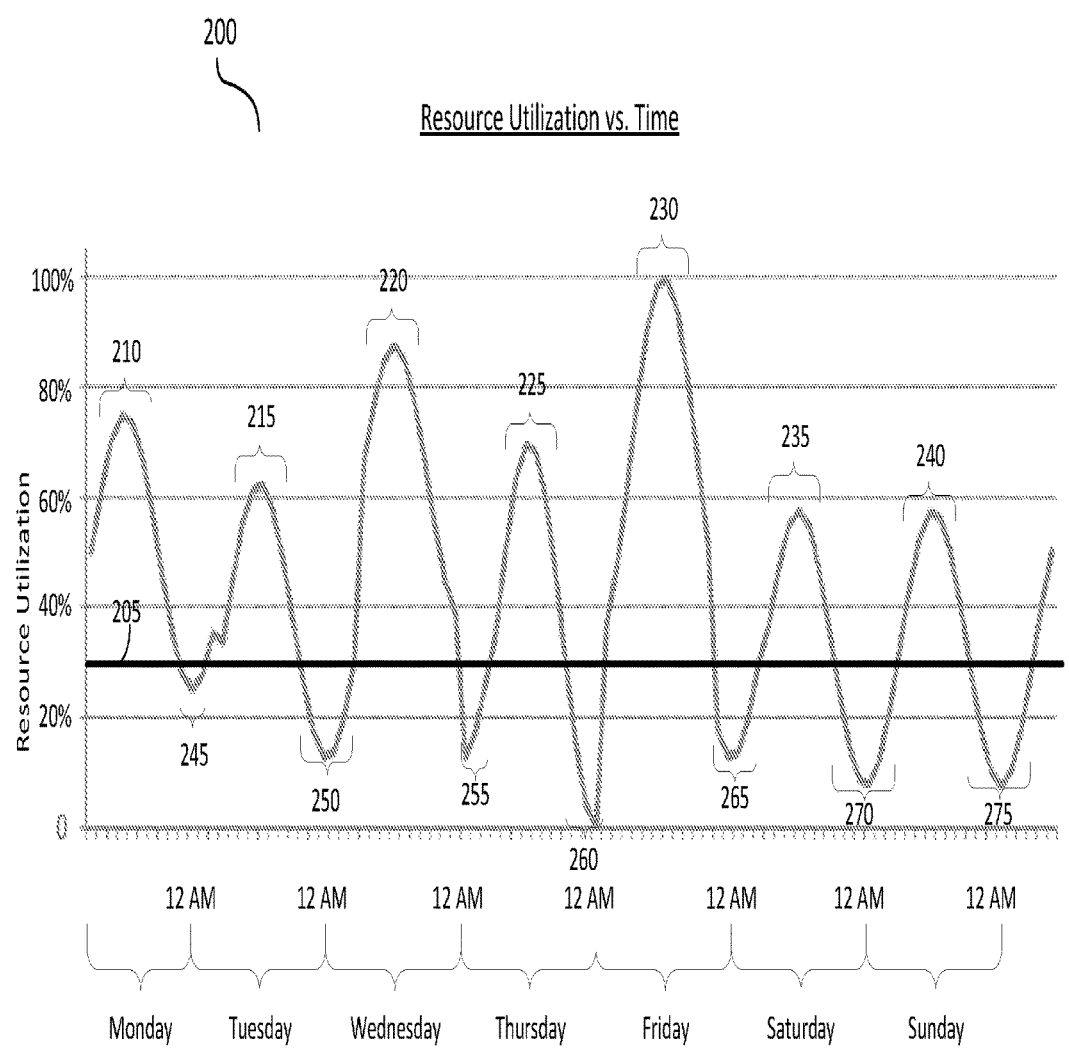
FIG. 2 is an illustration of a resource utilization graph used to reduce latency in fixed allocation content selection in accordance with an implementation.

FIG. 2 illustrates a resource utilization document 200 or resource utilization report 200 indicating sinusoidal resource utilization versus time in accordance with an implementation. The resource utilization report 200 can be retrieved or generated from data stored in a load balancing data structure 170 in data repository 155. The load balancer component 135 can monitor one or more computation resources to generate the resource utilization report 200. The load balancer component 135 can generate the resource utilization report 200 for one or more computation resources in the data processing system 120. The load balancer component 135 can generate the resource utilization report 200 for each computation resource of the data processing system 120. The load balancer component 135 can generate a combined resource utilization report 200 for multiple computation resources in the data processing system 120. For example, the resource utilization report 200 can be an average resource utilization for multiple computation resources, such as multiple computation resources grouped together in a zone, partition, geographic location, data center rack, data center, or geographic location.

The load balancer component 135 can identify the resource utilization report 200 for computation resources that are configured to perform the offline selection process.

The load balancer component 135 can determine a type of resource used to launch the offline selection process, and select the computation resource configured to provide the type of resource. For example, a type of resource configured to perform or launch the offline selection process can include a computation resource having a predetermined type of processor, processor configuration, processor speed, amount of memory, input/output controller. The type of resource can include a partition, zone, data center or other location of the resource. The load balancer component 135 can select the computation resource configured to provide the type of resource.

The load balancer component 135 can receive historical utilization information for one or more computation resources. The load balancer component 135 can generate the resource utilization report using or based on the historical utilization information. The historical utilization information can correspond to one or more time intervals. For example, the load balancer component 135 can generate the resource utilization report for a 12 hour time interval, 24 hour time interval, 48 hour time interval, 7 days, a month, a season (e.g., spring, summer, fall, or winter), a year, or other time interval. In some cases, the load balancer component 135 can generate resource utilization report for multiple time intervals. In some cases, the load balancer component 135 can combine historical utilization information for multiple time intervals to generate a resource utilization report indicating an average or aggregated resource utilization. The load balancer component 135 can match multiple time intervals based on a similarity or criteria to determine an average resource utilization for the time interval. The load balancer component 135 can use statistical techniques to combine historical utilization information to generate the resource utilization report. For example, the load balancer component 135 can identify features associated with the resource utilization such as day of the week, hour, geographic location, weather (e.g., rain, snow, sunny, cloudy, or windy), temperature, holiday, news event, or current event.

FIG. 2 illustrates a resource utilization report 200 generated based on historical utilization information. The resource utilization report 200 indicates sinusoidal utilization versus time for the computation resource. The resource utilization report 200 can include a graph with a y-axis that indicates resource utilization and an x-axis that indicates time (e.g., day of week, time of day, month, year, or specific date). The axes can be switched, in some cases. The resource utilization axis can be a normalized scale or range or absolute values. For example, the resource utilization axis can be normalized such that 100% indicates a maximum resource utilization resource of the historical information used to generate the resource utilization report 200. The resource utilization axis may indicate absolute values such that 100% indicates a 100% utilization of the resource. The resource utilization axis can refer to utilization of a particular type of resource, for example processor, memory, input/output, network bandwidth, or hard disk spin rate. The resource utilization axis can refer to combined utilization of multiple resources, such as a combination of two or more of processor, memory, input/output, network bandwidth, or hard disk spin rate. The load balancer component 135 can receive or combine the utilization of multiple of resources into a single metric, and plot or graph the single metric.

The resource utilization report 200 can include a graph with peaks that indicate a relative high resource utilization and troughs that indicate a relative low utilization. For example, peaks 210, 215, 220, 225, 230, 235 and 240 can indicate a relative high value for utilization of the one or more resources. Troughs 245, 250, 255, 260, 265, 270 and 275 can indicate relatively low utilization of the one or more resources. The load balancer component 135 can identify the peaks or troughs using a local minimum or local maximum identification technique.

The load balancer component 135 can select a time window during which to perform a computation task based on a trough in the resource utilization report. The computation task can include, for example, an offline content selection technique. The load balancer component 135 can identify the trough as a local minimum, such as troughs 245, 250, 255, 260, 265, 270 or 275. The load balancer component 135 can select a time window corresponding to any one of the troughs. In some cases, the load balancer component 135 can select one or more troughs based on trough selection criteria, such as a length of the trough or a minimum value of the trough. The length of the trough can correspond to the length of time the trough is below a threshold utilization, such as threshold utilization 205. For example, time window 255 may be too short, so the load balancer component 135 may not select time window 255 as a suitable time window, but may select time windows 250, 270 and 275 as suitable length time windows. The threshold utilization 205 can be a predetermined value or a dynamic value or a different value for different days or time intervals. For example, the predetermined value can include 20%, 25%, 30%, 35%, 40%, 45%, 50%, 55%, 60% or some other value that facilitates selecting a time window that reduces latency in fixed allocation content selection.

Using the threshold utilization 205, the load balancer component 135 can determine a time window corresponding to a trough (e.g., troughs 245, 250, 255, 260, 265, 270 or 275). The time window can be indicated by the width of the brackets at each trough. The width of the bracket corresponding to each trough can be based on where the utilization graph intersects with the threshold utilization value 205. The load balancer component 135 can select one or more time windows based on the length of the time window. For example, the load balancer component 135 can determine an amount of time to perform the computation task such as the offline selection process and select the time window that is equal to or greater than the amount of time to perform the computation task. The load balancer component 135 can determine the amount of time to perform the computation task based on a queue for the offline selection process, the number of content campaigns in the offline selection process, the number of content selection criteria, the number of candidate content items, the number of impression criteria, or other factors that impact resource utilization. Upon identifying a resource computation resource having a time window that indicates sufficient capacity to perform the computation task, the load balancer component 135 can instruct the content selector component 140 to launch or perform the offline selection module 145 during the identified time window using the identified computation resource.

In some cases, the load balancer component 135 can perform a check to confirm that the computation resource is available to perform the computation task during the identified time window. For example, the load balancer component 135 can request a current utilization of the computing resource at a first time during the identified time window. The first time during the time window can correspond to a beginning of the time window. The load balancer component 135 can determine whether the proceed or allow the computation task based on the current utilization information. For example, the historical utilization information may indicate a trough with a time window at 245 that begins approximately at 11 PM Tuesday nights. The load balancer component 135 can instruct the content selector component 140 to launch the offline selection module 145 at 11 PM (time can be local to the computation resource, a Universal Time or other time zone) on Tuesday. Prior to launching the offline selection module 145, the data processing system 120 can confirm that the expected or predicted utilization matches or corresponds to the current utilization. Thus, the data processing system 120 can monitor the current utilization at 11 PM on Tuesday. Responsive to determining that the current utilization at the first time during the time window corresponds to (e.g., less than or equal to) a resource consumption metric, the data processing system 120 can determine to launch the offline selection process during the time window. The resource consumption metric can be based on the expected, predicted, or historical utilization of the resource utilization report 200. The resource consumption metric can indicate a range based on the expected, predicted or historical utilization. For example, the resource consumption metric can be plus or minus 3%, 5%, 7%, 10%, 15%, 20%, or 30% or some other percentage of the expected, predicted, or historical utilization at the first time during the time window. For example, the current utilization at a first time during time window 250 may be 27%. The resource consumption metric can be plus or minus 5% of the expected utilization at the first time during the time window 250. If the expected utilization is at the first time of time window is 30%, then the resource consumption metric can be a range from 25% to 35%. Thus, the data processing system 120 can compare the current utilization of 27% with the resource consumption metric to determine that the current utilization satisfies the resource consumption metric because the current utilization is between 25% and 35%, which is plus or minus 5% of the expected or historical utilization. This can indicate that the expected utilization is accurate for the time interval, and the data processing system 120 can proceed to allow the content selector component 140 to perform the offline selection process. Thus, the data processing system 120 can confirm that computation resource has the capacity to perform the computation task during time window 250 without adding latency for other tasks performed by the data processing system 120 as predicted based on the resource utilization report 200.

In some cases, however, the data processing system 120 can determine that the current utilization does not satisfy the resource consumption metric for the time window. The data processing system 120 can determine to delay launching the offline selection process on the computation resource at the first time during the time window responsive to the current utilization not satisfying a resource consumption metric for the offline selection process. For example, the current utilization during the first time of the time window 250 may be 40%. This may be greater than the resource consumption metric of plus or minus 5% of the expected utilization (e.g., 30%). The data processing system 120 can determine that there is anomalous behavior and abort or delay the offline selection process, or select a different computation resource that has capacity during the time window and is confirmed to have capacity during the time window. The data processing system 120 can delay launching the offline selection process to a next time window (e.g., delay from time window 250 to time window 255 or 260). Anomalous behavior can be caused by large computation events (e.g., major current event, news event, sports event, weather event, natural disaster, or trending topic), software or hardware issues in the computation resource, network attacks, viruses, or denial of service attacks.

The data processing system 120 can include a content selector component 140 designed, constructed, configured or operational to execute on the computation resource identified by the load balancer component 140. The content selector component 140 can execute on the identified computation resource to launch and in the time window identified by the load balancer component 135. The content selector component 140 can launch, during the time window, execution of the offline selection module 145 for the content campaign or one or more content campaigns in the offline selection queue. The content selector component 140 can launch the offline selection module 145 prior to receiving a request for content from the client computing device 110 on which a selected content item object may be displayed. For example, the content selector component 140 can perform the selection offline prior to receiving a request for content, and then perform a lookup responsive to the request and provide the content that was previously selected and matches the current impression criteria of the request.

The content selector component 140 can select content item objects during the offline selection module 145 or a real-time selection module 150. In the offline selection module 145, the content selector component 140 can generate, determine, create, produce, or otherwise identify candidate impressions each associated with impression criteria. A candidate impression can refer to a future impression that has yet to occur. The future or candidate impression can have impression criteria that characterize or define the impression. Example impression criteria can include a time of day, time interval during the day, content slot location (e.g., above the fold, below the fold, placement rank), size of content slot (e.g., number of pixels, dimensions, length by width), type of content (e.g., image, text, video, audio, multimedia), keywords, terms, phrases, topic, vertical, or search query. The impression criteria can include one or more criteria provided as selection criteria by the content provider 125.

The content selector component 140 can perform the offline selection module 145 including an offline auction. The content selector component 140 can input content campaigns that are eligible for the offline selection module 145 into the offline selection module 145. Data input into the offline selection module 145 can include, for example, historical impression data, content selection criteria of one or more content campaigns in the offline selection module 145, remaining duration of the one or more content campaigns, remaining allocation of the one or more content campaigns, bid amounts, or model for a quality score. The historical impression data can include information associated with an impression, such as time of day, type of device, geographic location, content slot location, topic, vertical, keywords, or search query terms. The offline selection module 145 can receive as input or utilize data used by the real-time selection process 145. In some cases, the offline selection module 145 can further process content campaigns that are not enabled for offline selection to determine whether a content campaign enabled for offline selection would be selected. If the content campaign enabled for offline selection is selected via the offline selection module 145, the content selector component 140 can allocate to the content campaign a candidate impression having impression criteria that matches the content selection criteria of the content campaign.

To identify the candidate content impressions for a content campaign enabled for offline selection, the content selector component 140 can launch an offline selection module 145 for the content campaign. The content selector component 140 can use one or more additional content campaigns of the data processing system 120 and historical impression data to execute the offline selection module 145. The historical impression data can include previous impressions and corresponding impression criteria for which the data processing system 120 has previously selected and provided content items. The historical impression data can include impression data that is likely to occur during a given time interval. For example, the historical impression data can include impression criteria that has a high likelihood (e.g., greater than 50%, 60%, 75%, 80%, 85%, 90%, 95%, 99%) of occurring during a given time interval, such as a minute, 10 minutes, 30 minutes, in an hour, 2 hours, 6 hours, 12 hours, 24 hours, 48 hours, 72 hours, 1 week, 30 days or some other time interval.

The content selector component 140 can identify one or more impressions from the historical impression data. Each impression can have impression criteria that include, for example, time, type of computing device, geographic location, or a keyword. Table 1 illustrates example historical impression criteria used by the content selector component 140 in the offline selection process.

TABLE 1

Illustrates historical impressions used in the offline selection process

| Impression identifier | Time | Device Type | Location | Keyword |
|---|---|---|---|---|
| impression_1 | 8AM-10AM | Smartphone | California | Eggs |
| impression_2 | 11AM-1PM | Laptop | California | Cruise |
| Impression_3 | 5PM-7PM | smartphone | California | pizza |

The content selector component 140 can perform the offline selection module 145 for one or more of the historical impressions to determine whether to select a content item object from one or more content campaign enabled for offline selection. In some cases, the content selector component 140 may determine that no content from content campaigns enabled for offline selection should be selected for the impression using the offline selection module 145. Instead, the content selector component 140 may determine to select content for such an impression using the real-time selection module 150.

The content selector component 140 can perform the offline selection module 145 for the content campaign having the following content item objects and selection criteria illustrated in Table 2.

TABLE 2

Illustration of content campaign data structure comprising content items and content selection criteria provided by the content provider of the content campaign.

| Content Items | Time | Device Type | Location | Keyword |
|---|---|---|---|---|
| Content Item 1 | 11AM-1PM | Smartphone | California | pizza |
| Content Item 2 | 5PM-7PM | Smartphone | California | pizza |
| Content Item 3 | 5PM-7PM | smartphone | California | calzone |

For example, to select content items for display in a textual environment, the data processing system 120 can parse the text to identify keywords, and use the keywords to select a matching content item based on a broad match, exact match, or phrase match. For example, the content selector 135 can analyze, parse, or otherwise process subject matter of candidate content items to determine whether the subject matter of the candidate content items correspond to the subject matter of the textual information resource. The content selector 135 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector component 140 may process the metadata to determine whether the subject matter of the candidate content item corresponds to the web page or search query.

Content providers 125 may provide additional indicators when setting up a content campaign that includes content items. The content provider may provide information at the content campaign or content group level that the content selector component 140 may identify by performing a lookup using information about the candidate content item. For example, the candidate content item may include a unique identifier, which may map to a content group, content campaign, or content provider. The content selector component 140 may determine, based on information stored in content campaign data structure in data repository 155, information about the content provider 125.

For example, the content selector component 140 can execute the offline selection module 145 for the first impressions in Table 1 using the content campaign illustrated in Table 2 as follows:

Impression_1 has time impression criteria 8 AM-10 AM, and keyword impression criteria eggs. Since none of the content selection criteria of the content campaign match the time impression criteria or the keyword impression criteria, the content selector component 140 determines not to select any content from the content campaign for impression_1.

Impression_2 has device type impression criteria laptop and keyword impression criteria cruise. Since none of the content selection criteria of the content campaign match the device type impression criteria or the keyword impression criteria, the content selector component 140 determines not to select any content from the content campaign for impression_2.

Impression_3 has impression criteria that match content item 2. The content selector component 140 can, responsive to the match, select content item 2 for impression_3. The content selector component 140 can fix or predetermine that content item 2 is to be allocated for impression_3.

The content selector component 140, via the offline selection module 145, can generate a list of one or more candidate impressions that match the content campaign as shown in Table 3. The content selector component 140 can store this list in a candidate impression data structure 175 in data repository 155.

TABLE 3

Illustration of a list of candidate impressions for which a content item is allocated

| Candidate Impression | Time | Device Type | Location | Keyword | Content Item |
|---|---|---|---|---|---|
| Impression_3 | 5PM-7PM | smartphone | California | pizza | Content Item 3 |

The data processing system 120 can receive, via a computer network, a request for content for presentation on a computing device. The request can include selection criteria of the request, such as the device type, location, and a keyword associated with the request. The keyword can be associated with the webpage on which the content is to be displayed, a search query input by the user of the computing device, or other information associated with the request or the computing device.

Responsive to the request, the data processing system 120 can perform a lookup with the request selection criteria in the candidate impression data structure. The candidate impression data structure stores one or more candidate impressions generated by the content selector component 140 in the offline selection module 145. Using the lookup, the data processing system 120 can identify a candidate impression from the candidate impression data structure that has impression criteria that matches the selection criteria of the request. If the data processing system 120 identifies a candidate impression from the candidate impression data structure that has impression criteria that matches the selection criteria of the request, the data processing system 120 can disable real-time content selection process 150 for the request. The data processing system 120 can disable the real-time content selection process 150 for the request because the candidate impression in the candidate impression data structure that matches the content selection criteria of the request already identifies a content item that is allocated for the impression. This content item was allocated or selected for the impression using the offline selection module 145. This content item was allocated or selected for the impression using the offline selection module 145 prior to receive the request.

The data processing system 120 can provide the content item object pre-allocated or selected for the impression to the computing device requesting content. The data processing system 120 can transmit, via the computer network to the computing device, instructions to render the content item object of the content campaign, the content item object that corresponds to the first impression criteria that matches the selection criteria of the request, the instructions cause the computing device to render the content item object for display by a display device of the computing device.

For example, a smartphone (e.g., a computing device 110) can access, via a web browser 180, a resource such as a webpage that includes an article ranking the top ten restaurants in San Jose, Calif. One or more of the restaurants may be a pizza restaurant. The data processing system 120 can receive a request for content from the content publisher 115 of the website or from the smartphone 110. The request can indicate content selection criteria such as a time of 6 PM, a keyword of the webpage as "pizza", and the type of device as "smartphone". The data processing system 120 can perform a lookup in the candidate impression data structure 175 using the time, keyword, and device type associated with the request to identify that the selection criteria of the request matches the impression criteria of an impression (e.g., impression_3) in the candidate impression data structure 175. In response to identifying the match, the data processing system 120 can disable the real-time selection module 150 for the request. Instead of performing the real-time selection module 150 for the request, the data processing system 120 can provide the content item (e.g., content item 3) that was previously allocated to candidate impression_3 during the offline selection module 145. Thus, the data processing system 120 can reduce latency in fixed allocation content selection by provided the previously allocated content item.

FIG. 2 is an illustration of a resource utilization graph 200 used to reduce latency in fixed allocation content selection in accordance with an implementation. The data processing system 120 (e.g., via load balancer component 135) can monitor one or more computation resources of the data processing system 120 to generate the resource utilization graph 200. The graph 200 can include a histogram, pie chart, 3D graph, scatter plot, line graph, line of best fit, table, spreadsheet, comma separated file, plot or other tool to facilitate identify resource utilization during a time interval.

The graph 200 illustrates resource utilization during a 7 day time interval, such as a week. The time axis includes days Monday, Tuesday, Wednesday, Thursday, Friday, Saturday and Sunday. The time axis further indicates the time (e.g., hour) during the day. The time axis can have a different scale and provide more granular or less granular information. For example, the time axis can be for one or more hours, one or more days, one or more weeks, one or more months, one or more seasons, or one or more years. In some cases, the graph can be for a day of the year, such as one or more January 1s.

The resource utilization axis can indicate an amount of resource utilization. The amount can be an absolute value, a percentage, or normalized. The resource can be processor utilization, memory utilization, thermal value, disk speed, number of input/output, or network bandwidth usage.

The graph 200 can be for a single computation resource, virtual machine, physical computation resource, a group of computation resources, a server, a data rack, partition, zone, or data center.

FIG. 3 is an illustration of a data processing system 120 having a distributed computing environment in accordance with an implementation. The data processing system 120 can include a plurality of computation resources or servers located in at least one zone. The data processing system 120 can include multiple, logically-grouped computation resources and facilitate distributed computing techniques. The logical group of computation resources may be referred to as a data center, server farm or a machine farm. The computation resources can also be geographically dispersed. A machine farm may be administered as a single entity, or the machine farm can include a plurality of machine farms. The computation resources within each machine farm can be heterogeneous—one or more of the servers or machines can operate according to one or more type of operating system platform.

Computation resources in the machine farm can be stored in high-density rack systems, along with associated storage systems, and located in an enterprise data center. For example, consolidating the computation resources in this way may improve system manageability, data security, the physical security of the system, and system performance by locating computation resources and high performance storage systems on localized high performance networks. Centralizing the computation resources and storage systems and coupling them with advanced system management tools allows more efficient use of computation resources.

For example, the data processing system 120 can include one or more zones: Zone 1 and Zone 2. A zone can refer to a geographic area in which one or more computation resources 305 are located. Zones can refer to a geographic area such as a city, town, state, country, hemisphere, geographic coordinates, or address.

Zone 1 can include one or more partitions, such as Zone 1-Partition 1 and Zone 1-Partition 2. Zone 2 can include one or more partitions such as Zone 2-Partition 1; and Zone 2-Partition 2. A partition can refer to a collection, group, or subset of computation resources 305 within a zone. The partition can facilitate load balancing. For example, the load balancer component 135 can identify a partition within the zone that has processing capacity to perform a computation task. In some cases, a partition can refer to a disk partition. For example, computation resources in zone 1—partition 1 can access a hard disk drive or memory corresponding to partition 1.

A computation resource 305 can include one or more component or functionality of a computing device, such as computing device 800, a processor, memory, hard disk drive, software, or storage.

The data processing system 120 can monitor computation resources 305 of the distributed computing environment to generate the resource utilization graph 200. The data processing system 120 can generate a resource utilization graph 200 for each computation resource 305. IN some cases, the data processing system 120 can generate a resource utilization graph for a partition, or a zone. For example, the resource utilization graph 200 can indicate the resource utilization versus time for Zone 1-Partition 1 by aggregating or combining the resource utilization among some or all of the computation resources 305 corresponding to Zone 1-Partition 1.

Figure 4:
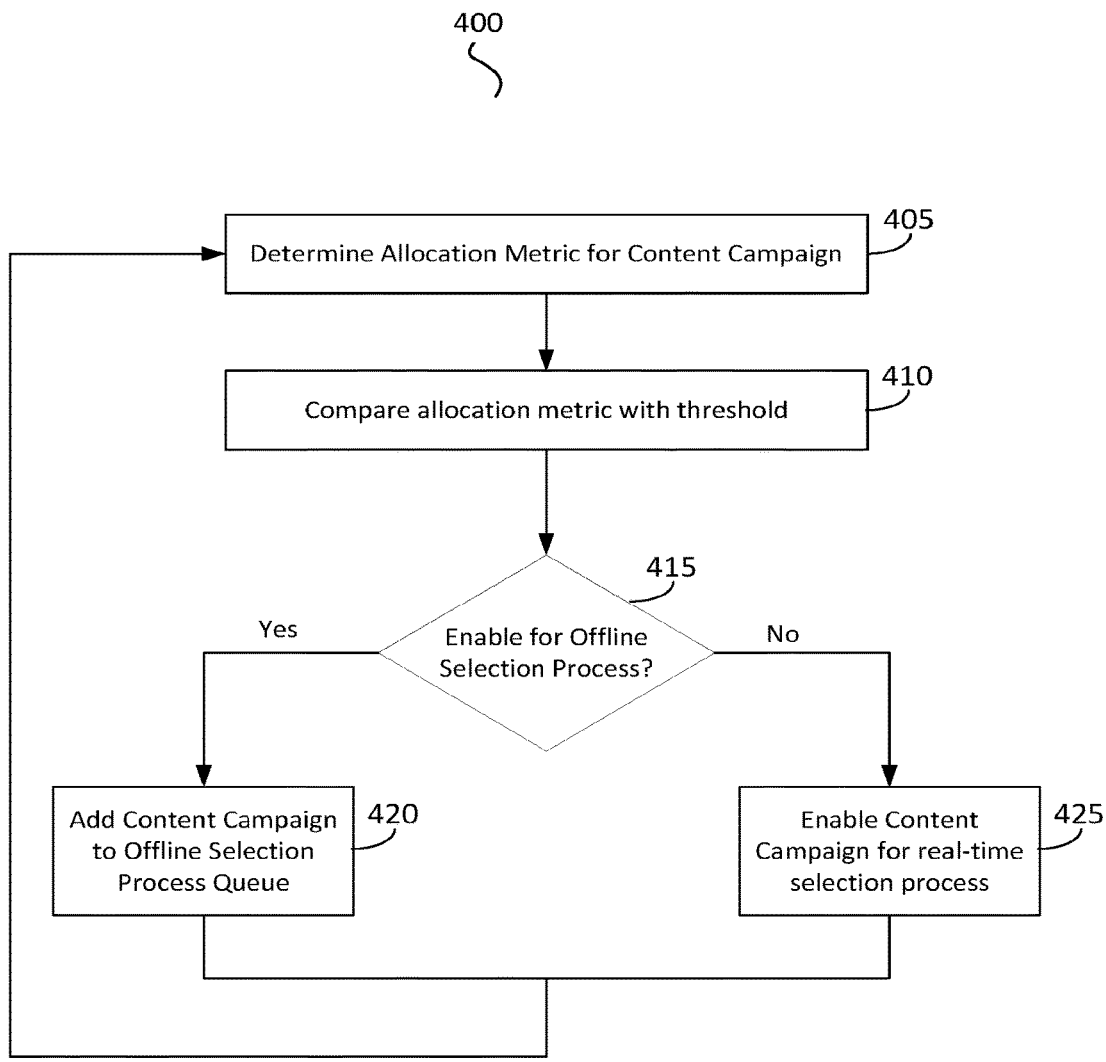
FIG. 4 is an illustration is a flow chart for reducing latency in fixed allocation content selection in accordance with an implementation.

FIG. 4 is an illustration is a flow chart 400 for reducing latency in fixed allocation content selection in accordance with an implementation. The method 400 can be performed via one or more system or component illustrated in FIG. 1, FIG. 2, FIG. 3, or FIG. 8, including, e.g., a data processing system, allocator engine, load balancer component, content selector component, data repository, content provider, content publisher, network, computing device, or computation resource.

At act 405, the data processing system determines an allocation metric for the content campaign. The data processing system can determine the allocation metric based on historical data or performance of the content campaign, such as budget remaining, allocation remaining, or duration of the campaign. The data processing system can compare the allocation metric with a threshold at act 410. The data processing system can determine whether to enable an offline selection process at act 415. The data processing system can enable the offline selection at act 415 based on the comparison of the allocation metric for the content campaign with the threshold 410. For example, if the allocation metric satisfies the threshold, the data processing system can determine to enable or "yes" to enable the content campaign for the offline selection process at act 420. The data processing system can add the content campaign to the offline selection process queue at act 420. If the data processing system determines not to enable or "no" for the offline selection process, the data processing system can enable the content campaign for real-time selection process at act 425. In some cases, the content campaign may be default enabled to real-time selection. The data processing system may not make any change if the default setting is enabled for real-time selection process. Thus, enabling may refer to leaving the setting at enabled for real-time selection process. The data processing system can repeat this flow for the content campaign or one or more content campaign based on a time interval, such as every hour, every 6 hours, every 12 hours, every 24 hours, every 48 hours, or some other time interval.

Figure 5:
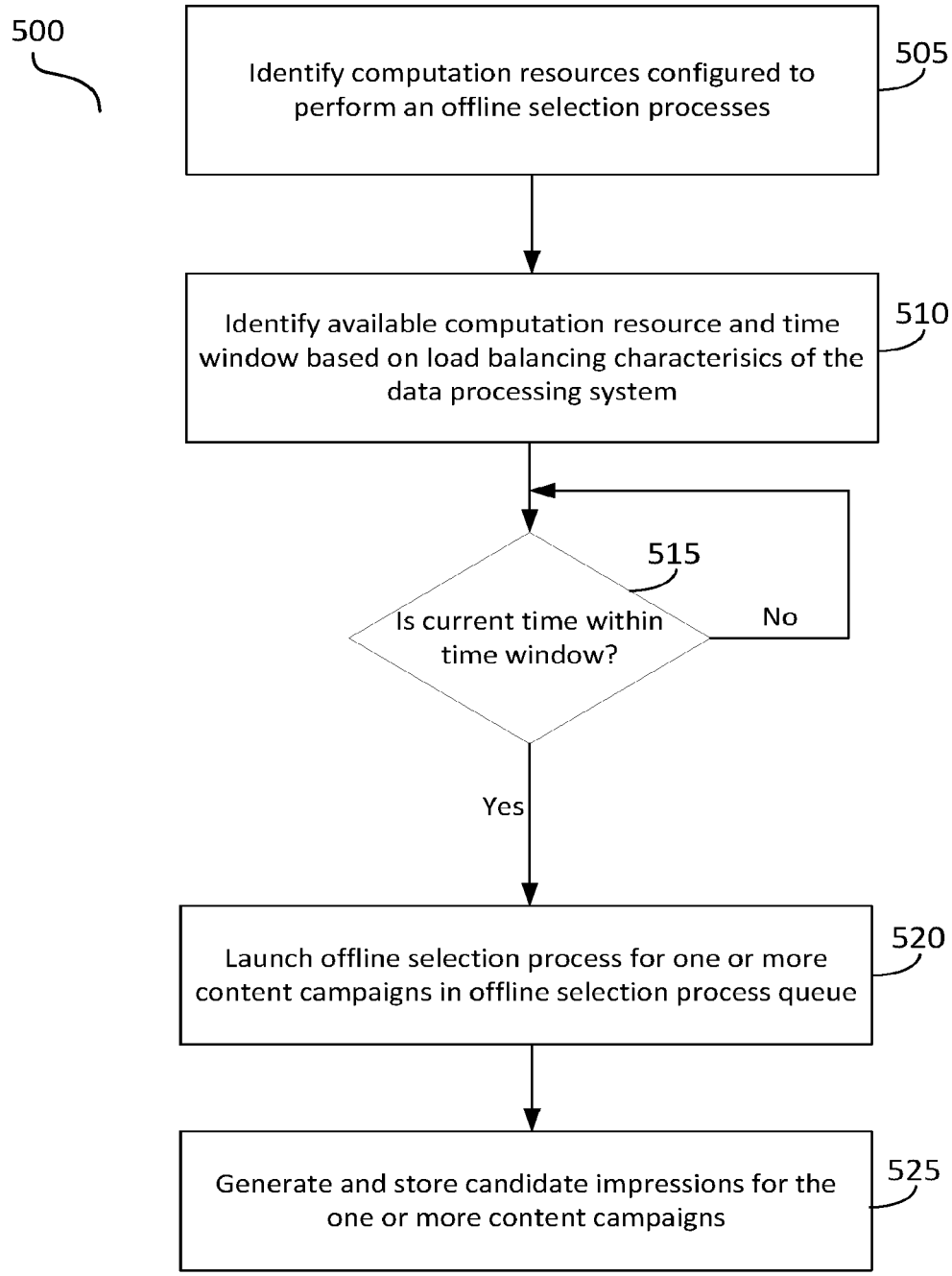
FIG. 5 is an illustration is a flow chart for reducing latency in fixed allocation content selection in accordance with an implementation.

FIG. 5 is an illustration is a flow chart 500 for reducing latency in fixed allocation content selection in accordance with an implementation. The method 500 can be performed via one or more system or component illustrated in FIG. 1, FIG. 2, FIG. 3, or FIG. 8, including, e.g., a data processing system, allocator engine, load balancer component, content selector component, data repository, content provider, content publisher, network, computing device, or computation resource.

At act 505, the data processing system identifies computation resources that are configured to perform an offline selection process. The data processing system can identify which computation resources have the suitable configuration to perform the offline selection, such as hardware requirements (e.g., processor type or speed), memory (e.g., total memory or speed of memory), disk type, operating system, software components, or network configuration. At act 510, the data processing system can identify a time window during which the computation resources having the suitable configuration are available to perform the computation task, such as the offline selection process.

At act 515, the data processing system can determine whether a current time falls within the time window. If the current time falls within the time window, the data processing system can, at act 520, proceed to launch the offline selection process for the one or more content campaigns in the offline selection process queue. If the current time is not within the identified time window, then the data processing system can wait and check at a later time to see if the current time is within the time window. In some cases, the data processing system can provide an instruction to a content selector to launch the offline selection process at the identified time. At act 525, the data processing system can generate and store candidate impressions for the one or more content campaigns in the offline selection process.

Figure 6:
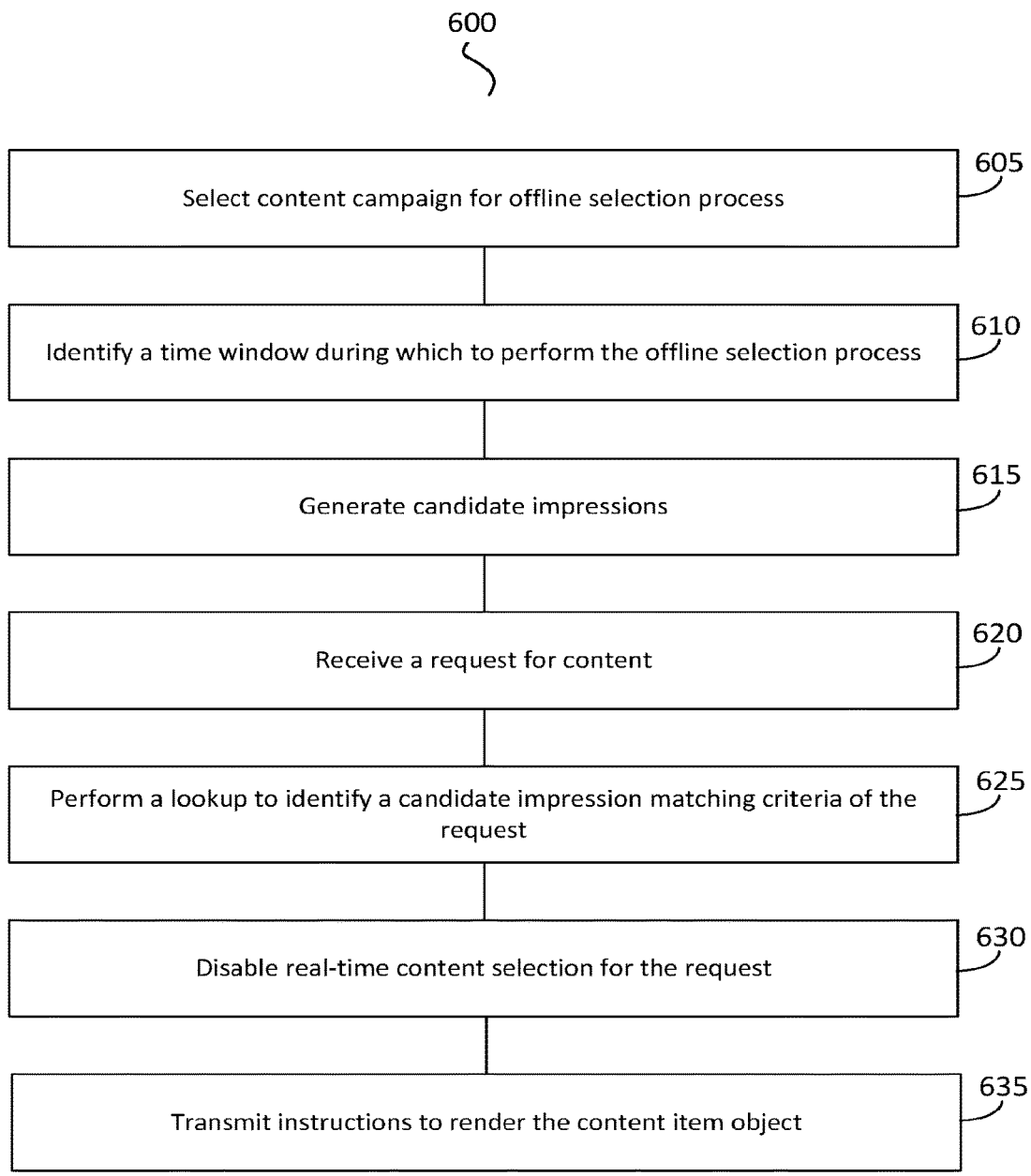
FIG. 6 is an illustration of a method for reducing latency in fixed allocation content selection in accordance with an implementation.

FIG. 6 is an illustration of a method 600 for reducing latency in fixed allocation content selection in accordance with an implementation. The method 600 can be performed via one or more system or component illustrated in FIG. 1, FIG. 2, FIG. 3, or FIG. 8, including, e.g., a data processing system, allocator engine, load balancer component, content selector component, data repository, content provider, content publisher, network, computing device, or computation resource. In brief overview, the method 600 can include, at act 605, a data processing system selecting a content campaign for an offline selection process. At act 610, the data processing system can identify a time window during which to perform the offline selection process. At act 615, the data processing system generate candidate impression. At act 620, the data processing system can receive a request for content from a computing device. At act 625, the data processing system can perform a lookup to identify a candidate impression having impression criteria that matches content selection criteria of the request. At act 630, the data processing system can disable real-time content selection for the request. At act 635, the data processing system can transmit instructions to render the content item object that was allocated for the matching impression.

Still referring to FIG. 6, and in further detail, at act 605, a data processing system selects a content campaign for an offline selection process. The data processing system can select the content campaign for the offline selection process based on an allocation metric. The data processing system (e.g., via an allocator engine) can determine the allocation metric for a content campaign. The data processing system can determine the allocation metric based on forecasted utilization for a duration. Utilization for the content campaign can refer to a number of impressions, clicks, selections, budget remaining for the content campaign, or time remaining for the content campaign. The data processing system can determine the allocation metric based on a utilization rate and a duration. For example, if the click through rate is forecasted or estimated as 1 selection for every 1000 impressions, and the content campaign averages 10,000 impressions per day, then the data processing system can determine the utilization is 10 selections per day. If the content campaign bids 10 cents for each selection, then the data processing system can determine that the amount spent per day for the content campaign is $1. The data processing system can further estimate that if there are 7 total days in the campaign, then the content campaign would have a utilization, allocation or spend of $7. However, if the content provider desires a fixed allocation, utilization, or spend of $10, the data processing system can determine that at the current utilization rate, the spend would only be 70% of the desired or allocated budget. The data processing system can determine that the content campaign will not achieve the desired allocation at the current rate. The data processing system can determine the allocation metric based on the amount of spend remaining and the duration remaining for the content campaign. The data processing system can determine an allocation metric that indicates a likelihood of the content campaign achieving the desired allocation. For example, if there are 4 days left in the campaign (or 57% duration remaining) and 70% of the budget is remaining, the data processing system can determine the allocation metric as 57/70 or 0.81. The data processing system can compare the allocation metric with a threshold (e.g., 0.6, 0.7, 0.8, 0.9) to determine whether to enable offline selection. The data processing system can determine that the allocation metric satisfies the threshold, and proceed to enable offline selection for the content campaign.

In some cases, the data processing system can determine a second allocation metric for a second content campaign, and disable the offline selection process for the second content campaign responsive to the second allocation metric less than the threshold.

At act 610, the data processing system can identify a time window during which to perform the offline selection process. The data processing system can identify a computation resource to perform the offline selection process and the time window during which to perform the offline selection process. The data processing system (e.g., via a load balancer) can use resource utilization information received from one or more servers in a distributed computing environment. The data processing system can identify, based on the resource utilization information, a computation resource in the distributed computing environment to perform the offline selection process. The data processing system can identify a time window during which to launch the offline selection process. The computation resource can have sufficient availability or capacity to perform the offline selection process during the identified time window.

The data processing system can determine a type of resource used to launch the offline selection process. The type of resource can refer to the type of configuration, specifications, or requirements of a computation resource that to perform the offline selection process. The data processing system can monitor one or more computation resources or servers of the data processing system or distributed computing environment that match the determined type. The data processing system can monitor the computation resources or servers to generate a resource utilization report. The report can indicate sinusoidal utilization versus time for the computation resource. The data processing system can select or identify the time window based on a trough in the resource utilization report. The time window corresponding to the trough or local minimum can indicate that there is expected to be sufficient capacity during the time window to perform the offline selection process without causing latency or by reducing latency in other real-time tasks of the data processing system.

At act 615, the data processing system can generate candidate impressions. The data processing system can launch the offline selection process to generate the candidate impressions.

The data processing system (e.g., via a content selector) can launch, for execution on the computation resource identified by the load balancer component and during the time window identified by the load balancer component, the offline selection process for the content campaign. The data processing system can launch the offline selection process prior to receiving the request for content. The data processing system can generate candidate impressions each associated with impression criteria. The impression criteria can include at least one of time, type of computing device, geographic location, or a keyword.

At act 620, the data processing system can receive a request for content from a computing device. The data processing system can receive the request via a computer network. The request can include a request for content for presentation on a computing device. The request can include selection criteria associated with the request, such as a timestamp, location, keyword, or device type.

At act 625, the data processing system can perform a lookup to identify a candidate impression having impression criteria that matches content selection criteria of the request. The data processing system can perform the lookup responsive to the request. The data processing system can perform the lookup using the selection criteria. The data processing system can perform the lookup in a data structure storing the candidate impressions generated by the content selector during the offline selection process. The data processing system can identify, based on the lookup, a first candidate impression of the plurality of candidate impressions having first impression criteria matching the selection criteria of the request.

At act 630, the data processing system can disable real-time content selection for the request. For example, the data processing system can disable real-time content selection for the request responsive to the first impression criteria matching the selection criteria. While the data processing system may disable real-time selection for the request, the content campaign and other requests by the same or different computing devices may still be enabled for real-time selection. In some cases, disabling the real-time selection can refer to not performing the real-time selection, selecting a content item selected via an offline selection process, blocking the real-time selection process, avoiding the real-time selection process, or otherwise retrieving the previously selected content without having to execute a real-time selection process. Real-time selection process can refer to selecting a content item for an impression after receiving the request for content. In offline selection process, a content item is selected for the impression having impression criteria prior to the request for content. The offline selection process can select content using an online auction, bids, and other content campaigns.

At act 635, the data processing system can transmit instructions to render the content item object that was allocated for the matching impression. The data processing system can transmit the instructions via the computer network to the computing device. The data processing system can transmit instructions to render a content item object of the content campaign. The content item object can correspond to the first impression criteria that match the selection criteria of the request. The instructions can cause the computing device to render the content item object for display by a display device of the computing device.

The data processing system can facilitate providing a fixed allocation or guaranteed allocation for a content campaign. For example, content campaigns can include a target revenue they would like to spend in a given time period. However it may be challenging to serve content items for the entire revenue precisely during the time period. The data processing system can provide a mechanism to identify a number of future or candidate impressions for the content campaign as guaranteed impressions (e.g., selected and allocated for the impression offline without having to perform a real-time selection). The selection or auction mechanisms for these impressions are run in advance (e.g., several days before the impression actually occurs) and a set number of impressions can be set aside for each future day to fulfill these guaranteed impressions. By allocating the content items to impressions before the computing device requests content or sees the impression, the data processing system can skip the real-time selection or auction steps at serving time. This enables the data processing system to serve content items and respond to the request for content faster. Additionally, by selecting and allocating content item objects to candidate impressions during non-peak times, and serving these allocated content item objects to these impressions during peak traffic times, the data processing system can reduce the CPU, memory, and network traffic costs during peak traffic. As a result, the data processing system and its servers are more efficiently utilized.

For example, the data processing system can identify a subset of impressions from each day and sell these impressions in advance of them actually occurring. The data processing system can remove the presold content items which win these impressions from the real-time auctions during the same time period. If an impression is not "presold", then it can be submitted to the real-time auction.

Since an estimated click through rate and quality score can affect which bids win the content selection process, the data processing system can use information about the candidate impressions. For example, the data processing system can use estimated click through rates and quality scores based on computing device clustering mechanisms. The data processing system can leverage these clustering mechanisms to identify computing device clusters with sufficiently consistent impression counts each day to be predictable. The data processing system can then use a subset of each of these clusters to allocate impressions for the fixed allocation content selection technique.

An impression can be allocated in advance of it being recorded (e.g., prior to a request for content) based on the set of selection criteria that would fulfill that impression. The computing device that received the pre-allocated content item object would be associated with a request for content that has selection criteria that matches the impression criteria, such as a search term or time of day that aligns with a content campaign.

The guaranteed criteria pool can include a map or list of content campaigns that have guaranteed impressions and the number of impressions the content campaigns won within this criteria. On the day the impression is seen, the impression criteria of the impression can be compared against these guaranteed criteria sets. If the impression matches a criteria set from the guaranteed pool, then the data processing system can select a content item from the pool, and reduce by one the number of remaining guaranteed impressions for that content campaign and criteria pool.

During the last days of a content campaign, the data processing system can use this model to shift the content campaign from a real-time auction selection process to a guaranteed model in order to allocate the last of the campaign funds. Some campaigns may have under-bid and have little to no chance of fulfilling the entire number of impressions because the content provider did not bid enough. In these instances, the data processing system may determine that the campaigns may not be eligible for guaranteed impressions. As a result, the data processing system can cause campaigns to complete the entirety of the target allocation. Thus, campaigns may either complete the entirety of the target allocation, or fall substantially short of the target because they under-bid.

Since criteria can be narrow, the data processing system can filter out campaigns or keywords are that are not compatible with guaranteed impressions. For example, the data processing system may keep broad keywords or commonly requested keywords, and filter out narrow or specific keywords or exact matching.

Figure 7:
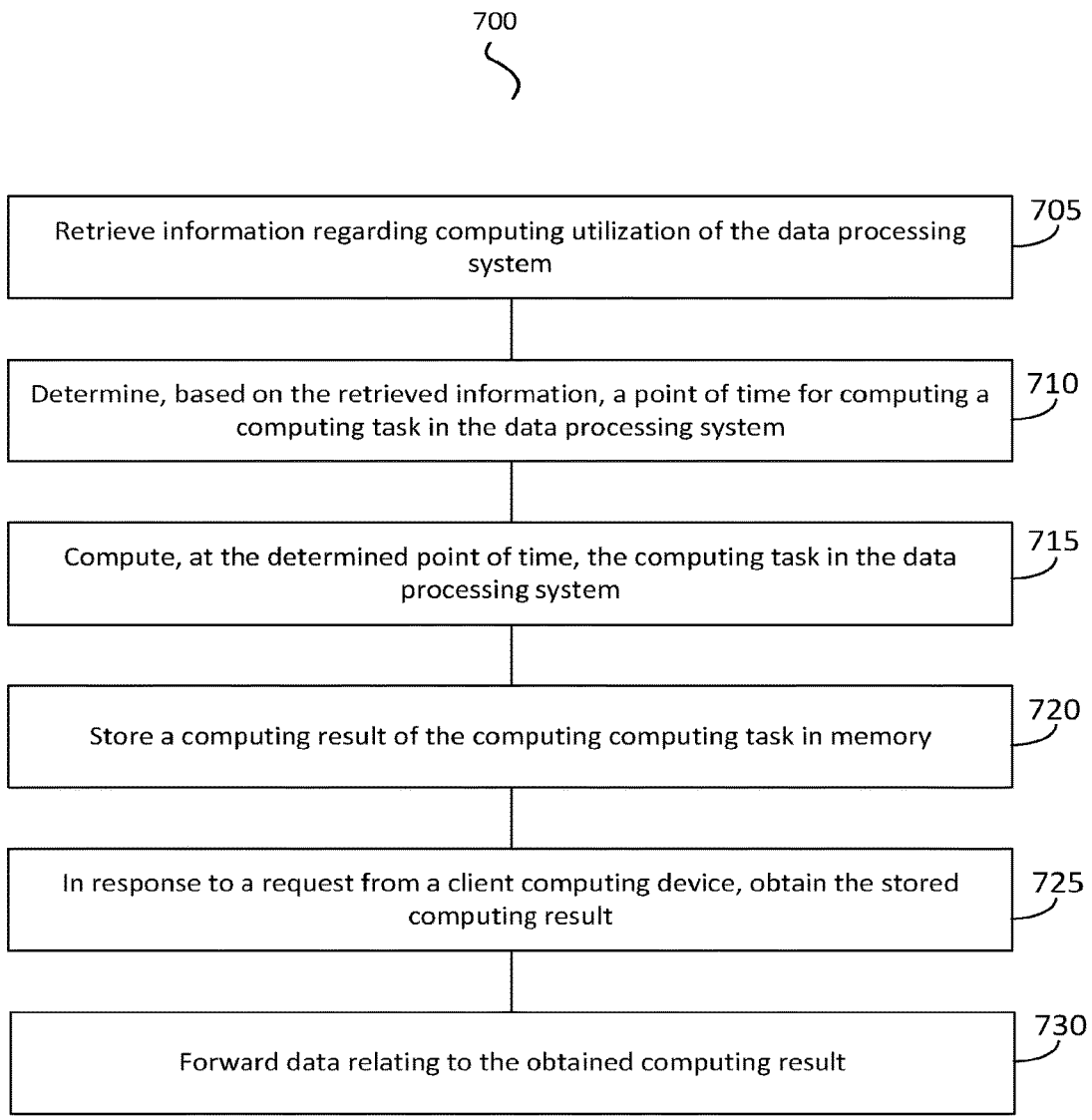
FIG. 7 is an illustration of a method for reducing latency in fixed allocation content selection in accordance with an implementation.

FIG. 7 is an illustration of a method for reducing latency in fixed allocation content selection in accordance with an implementation. The method can include a computer-implemented method for managing computing utilization of a management computing system (or data processing system) comprising at least one processor in communication with at least one memory. The data processing system can be configured to exchange data via a network with a user computing device. The method 700 can be performed via one or more system or component illustrated in FIG. 1, FIG. 2, FIG. 3, or FIG. 8, including, e.g., a data processing system, allocator engine, load balancer component, content selector component, data repository, content provider, content publisher, network, computing device, or computation resource.

At act 705, a data processing system can retrieve resource utilization information regarding computing utilization of the data processing system. For example, the data processing system can retrieve information regarding real-time computing utilization of the data processing system. The data processing system can retrieve information regarding predicted future computing utilization of the management computing system. The data processing system can retrieve information regarding historical computing utilization of the management computing system.

At act 710, the data processing system can determine, based on the retrieved information, a point of time or a time window for computing a computing task (e.g., an offline selection process) in the data processing system. The data processing system can determine, based on the retrieved information, at least one processor from a plurality of processors of the management computing system. For example, the data processing system can identify the processor that is configured to perform the computing task (e.g., has the appropriate hardware and software).

The data processing system can further identify a point in time or time window during which the identified processor has capacity to perform the computing task. The data processing system can determine whether the retrieved information regarding computing utilization of the management computing system indicates a utilization of the at least one processor below a predetermined threshold. The data processing system can determine, in response to determining that the utilization of the at least one processor is below the predetermined threshold, to compute the computing task in the management computing system.

At act 715, the data processing system can compute, at the determined point of time, the computing task in the data processing system. At act 720, the data processing system can store a computing result (e.g., candidate impression or content item that matches the candidate impression) of the computed computing task (e.g., the offline selection process) in the at least one memory. The data processing system can determine, based on the retrieved information, at least one memory from the plurality of memories, and store the computation result in the determined at least one memory.

The data processing system can determine the data to use for the computing task based on a forecast model. The forecast model can indicate which data to compute using a computing task that is in advance of receiving the request for content from the user computing device. In some cases, the data processing system can include a content selector component that performs a selection process or auction process. The content selector component can perform the computing task. The computing task can include a task relating to computing of auction bids of an ad auction. The forecast model can takes at least one of the following input data into consideration: ad keywords; historical ad data; geographical location of the user computing device; or remaining time in an ad or online content item campaign.

At act 725, the data processing system can receive a request from a user computing device and, in response to the request, obtain the stored computing result from the at least one memory. The request from the user computing device can include a search request in an Internet search engine. The request from the user computing device may not trigger real-time computing of the computing task. For example, the data processing system can determine that the retrieved information regarding computing utilization of the data processing system indicates a utilization of the at least one processor above a predetermined threshold. In response to the request from the user computing device and in case it has been determined that the retrieved information regarding computing utilization of the management computing system indicates a utilization of the at least one processor above the predetermined threshold, the data processing system can forward the previously selected data to the user computing device.

At 730, the data processing system can forward data relating to the obtained computing result (e.g., instructions to render the selected content item object) to the computing device. A time difference between the storing of the computing result and the forwarding of the data to the user computing device is can be greater than 12 hours, 24 hours, 48 hours, or 72 hours.

In some cases, the data processing system can exchange data regarding the computing task via communication links (e.g., computer network) between processors and memories in the management computing system. The data processing system can retrieve information regarding data traffic on the plurality of communication links. The data processing system can determine, based on the retrieved information regarding data traffic, at least one communication link that forwards an amount of data traffic exceeding a predetermined threshold. The data processing system can selectively reducing the data traffic on the determined at least one communication link. For example, the data processing system can select a different computation resource in a different partition or zone of the data processing system to perform computing tasks.

Figure 8:
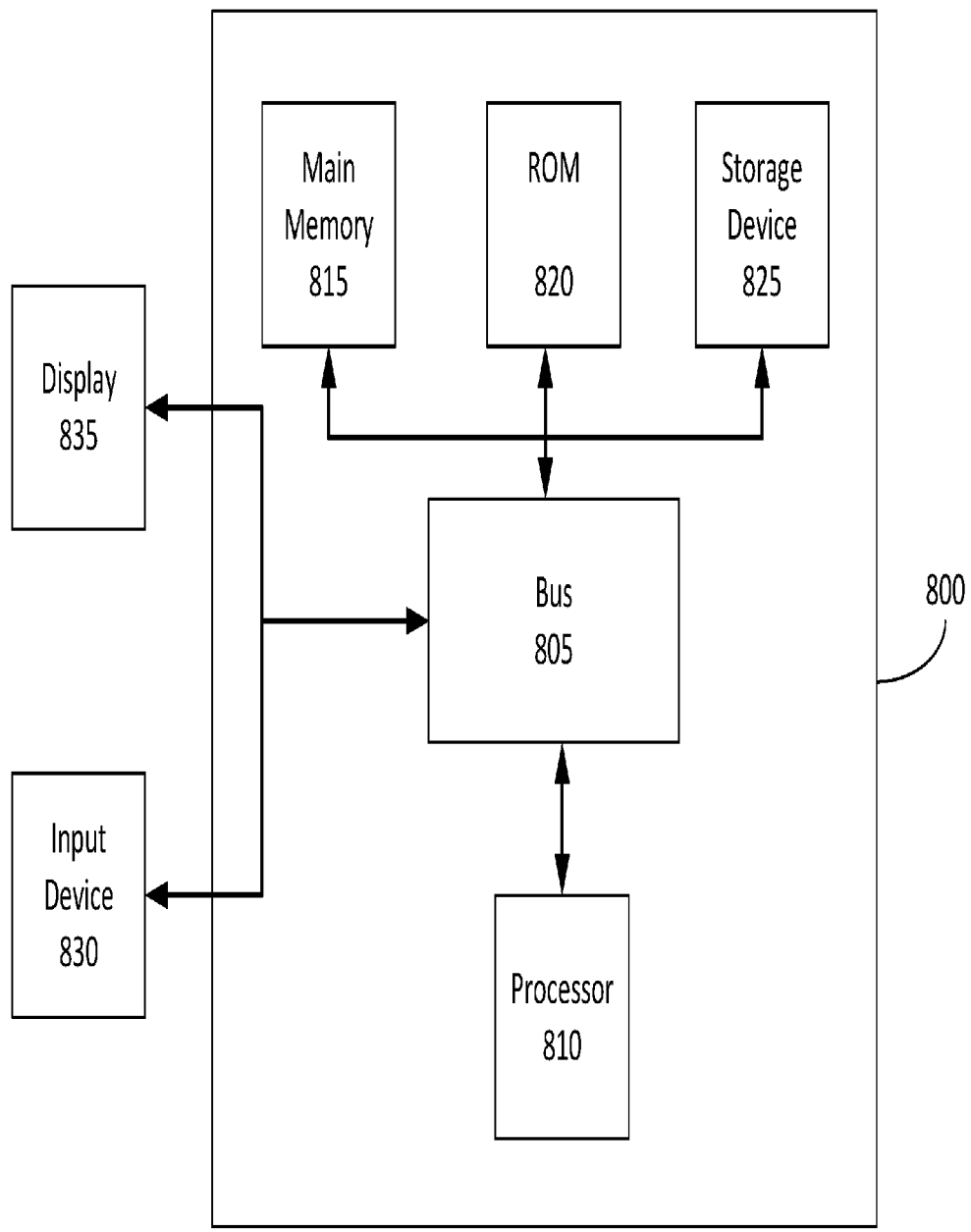
FIG. 8 is a block diagram illustrating a general architecture for a computer system that may be employed to implement various elements of the systems shown in FIGS. 1 and 3, the graph shown in FIG. 2, and the flow charts and methods shown in FIGS. 4, 5, 6 and 7, in accordance with an implementation.

FIG. 8 is a block diagram of a computer system 800 in accordance with an illustrative implementation. The computer system or computing device 800 can include or be used to implement the system 100, content provider 125, computing device 110, content publisher 115, data processing system 120, allocator engine 130, load balancer component 135, content selector component 140, data repository 155, and computation resource 505. The computing system 800 includes a bus 805 or other communication component for communicating information and a processor 810 or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. The main memory 815 can be or include the data repository 155. The main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions. The storage device 825 can include or be part of the data repository 155.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information and command selections to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the computing device 110 or other component of FIG. 1, for example.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an example computing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms. References to at least one of a list of elements can include any of a single element, more than one element, or all elements identified in the list.

Where technical features in the drawings, detailed description or any claim are followed by reference identifiers, the reference identifiers have been included to increase the intelligibility of the drawings, detailed description, or claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to reduce latency in fixed allocation content selection, comprising:
an allocator engine that executes on at least one processor of a data processing system to:
determine an allocation metric for a content campaign; and
select, responsive to a comparison of the allocation metric with a threshold, the content campaign for offline selection;
a load balancer component that executes on the data processing system to identify, based on resource utilization information received from one or more servers in a distributed computing environment, a computation resource in the distributed computing environment to perform the offline selection and a time window in which to launch the offline selection; and
a content selector component that executes on the computation resource identified by the load balancer component to:
launch, in the time window identified by the load balancer component, the offline selection for the content campaign;
generate, responsive to the offline selection, a plurality of candidate impressions each associated with impression criteria;
receive, via a computer network, a request for content for presentation on a computing device, the request comprising selection criteria;
perform, responsive to the request, a lookup with the selection criteria in a data structure that stores the plurality of candidate impressions generated by the content selector in the offline selection to identify a first candidate impression of the plurality of candidate impressions associated with first impression criteria that matches the selection criteria of the request;
disable, based on a match between the first impression criteria and the selection criteria, a real-time content selection process for the request; and
transmit, via the computer network to the computing device, instructions to render a content item object of the content campaign, the content item object that corresponds to the first impression criteria that matches the selection criteria of the request, the instructions cause the computing device to render the content item object for display by a display device of the computing device.

2. The system of claim 1, comprising the data processing system configured to:
launch the offline selection prior to receipt of the request for content.

3. The system of claim 1, comprising the data processing system configured to:
determine the allocation metric based on forecasted allocation for a duration of the content campaign.

4. The system of claim 1, comprising the data processing system configured to:
determine the allocation metric based on an allocation rate of the content campaign and a duration of the content campaign.

5. The system of claim 1, wherein the allocation metric is a first allocation metric and the content campaign is a first content campaign, the data processing system configured to:
determine a second allocation metric for a second content campaign; and
disable the offline selection for the second content campaign responsive to the second allocation metric less than the threshold.

6. The system of claim 1, wherein the impression criteria includes at least one of time, type of computing device, geographic location, or a keyword.

7. The system of claim 1, comprising the load balancer component configured to:
monitor at least one of the one or more servers to generate a resource utilization report indicating sinusoidal utilization versus time for the computation resource; and
select the time window based on a trough in the resource utilization report.

8. The system of claim 1, comprising the load balancer component configured to:
determine a type of resource used to launch the offline selection; and
select the computation resource configured to provide the type of resource.

9. The system of claim 1, comprising the load balancer component configured to:
generate, based on historical utilization information, a resource utilization report indicating sinusoidal utilization versus time for the computation resource;
select the time window based on a trough in the resource utilization report;
request a current utilization of the computing resource at a first time during the time window; and
determine to launch the offline selection at the first time during the time window responsive to the current utilization satisfying a resource consumption metric for the offline selection.

10. The system of claim 1, comprising the load balancer component configured to:
generate, based on historical utilization information, a resource utilization report indicating sinusoidal utilization versus time for the computation resource;
select the time window based on a trough in the resource utilization report;
request a current utilization of the computing resource at a first time during the time window; and
determine to delay launching the offline selection process at the first time during the time window responsive to the current utilization not satisfying a resource consumption metric for the offline selection process.

11. A method of reducing latency in fixed allocation content selection, comprising:
- determining, by an allocator engine that executes on at least one processor of a data processing system, an allocation metric for a content campaign;
- selecting, by the allocator engine responsive to a comparison of the allocation metric with a threshold, the content campaign for an offline selection process;
- identifying, by a load balancer component that executes on the data processing system, using resource utilization information received from one or more servers in a distributed computing environment, a computation resource in the distributed computing environment to perform the offline selection process and a time window during which to launch the offline selection process;
- launching, by a content selector component that executes on the computation resource identified by the load balancer component and during the time window identified by the load balancer component, the offline selection process for the content campaign;
- generating, by the content selector component responsive to the offline selection process, a plurality of candidate impressions each associated with impression criteria;
- receiving, by the data processing system via a computer network, a request for content for presentation on a computing device, the request comprising selection criteria;
- performing, by the data processing system responsive to the request, using the selection criteria, a lookup in a data structure storing the plurality of candidate impressions generated by the content selector during the offline selection process to identify a first candidate impression of the plurality of candidate impressions having first impression criteria matching the selection criteria of the request;
- disabling, based on the first impression criteria matching the selection criteria, a real-time content selection process for the request; and
- transmitting, by the data processing system via the computer network to the computing device, instructions to render a content item object of the content campaign, the content item object corresponding to the first impression criteria that matches the selection criteria of the request, the instructions cause the computing device to render the content item object for display by a display device of the computing device.

12. The method of claim 11, comprising:
- launching, by the data processing system, the offline selection process prior to receiving the request for content.

13. The method of claim 11, comprising:
- determining, by the allocator engine, the allocation metric based on forecasted allocation for a duration of the content campaign.

14. The method of claim 11, comprising:
- determining, by the allocator engine, the allocation metric based on an allocation rate of the content campaign and a duration of the content campaign.

15. The method of claim 11, wherein the allocation metric is a first allocation metric and the content campaign is a first content campaign, comprising:
- determining, by the allocator engine, a second allocation metric for a second content campaign; and
- disabling, by the allocator engine, the offline selection process for the second content campaign responsive to the second allocation metric less than the threshold.

16. The method of claim 11, wherein the impression criteria includes at least one of time, type of computing device, geographic location, or a keyword.

17. The method of claim 11, comprising:
- monitoring, by the load balancer component, at least one of the one or more servers to generate a resource utilization report indicating sinusoidal utilization versus time for the computation resource; and
- selecting, by the load balancer component, the time window based on a trough in the resource utilization report.

18. The method of claim 11, comprising:
- determining, by the load balancer component, a type of resource used to launch the offline selection process; and
- selecting the computation resource configured to provide the type of resource.

19. The method of claim 11, comprising:
- generating, by the load balancer component based on historical utilization information, a resource utilization report indicating sinusoidal utilization versus time for the computation resource;
- selecting, by the load balancer component, the time window based on a trough in the resource utilization report;
- requesting, by the load balancer component, a current utilization of the computing resource at a first time during the time window; and
- determining, by the load balancer component, to launch the offline selection process at the first time during the time window responsive to the current utilization satisfying a resource consumption metric for the offline selection process.

20. The method of claim 11, comprising:
- generating, by the load balancer component based on historical utilization information, a resource utilization report indicating sinusoidal utilization versus time for the computation resource;
- selecting, by the load balancer component, the time window based on a trough in the resource utilization report;
- requesting, by the load balancer component, a current utilization of the computing resource at a first time during the time window; and
- determining, by the load balancer component, to delay launching the offline selection process at the first time during the time window responsive to the current utilization not satisfying a resource consumption metric for the offline selection process.

* * * * *